UNITED STATES PATENT OFFICE.

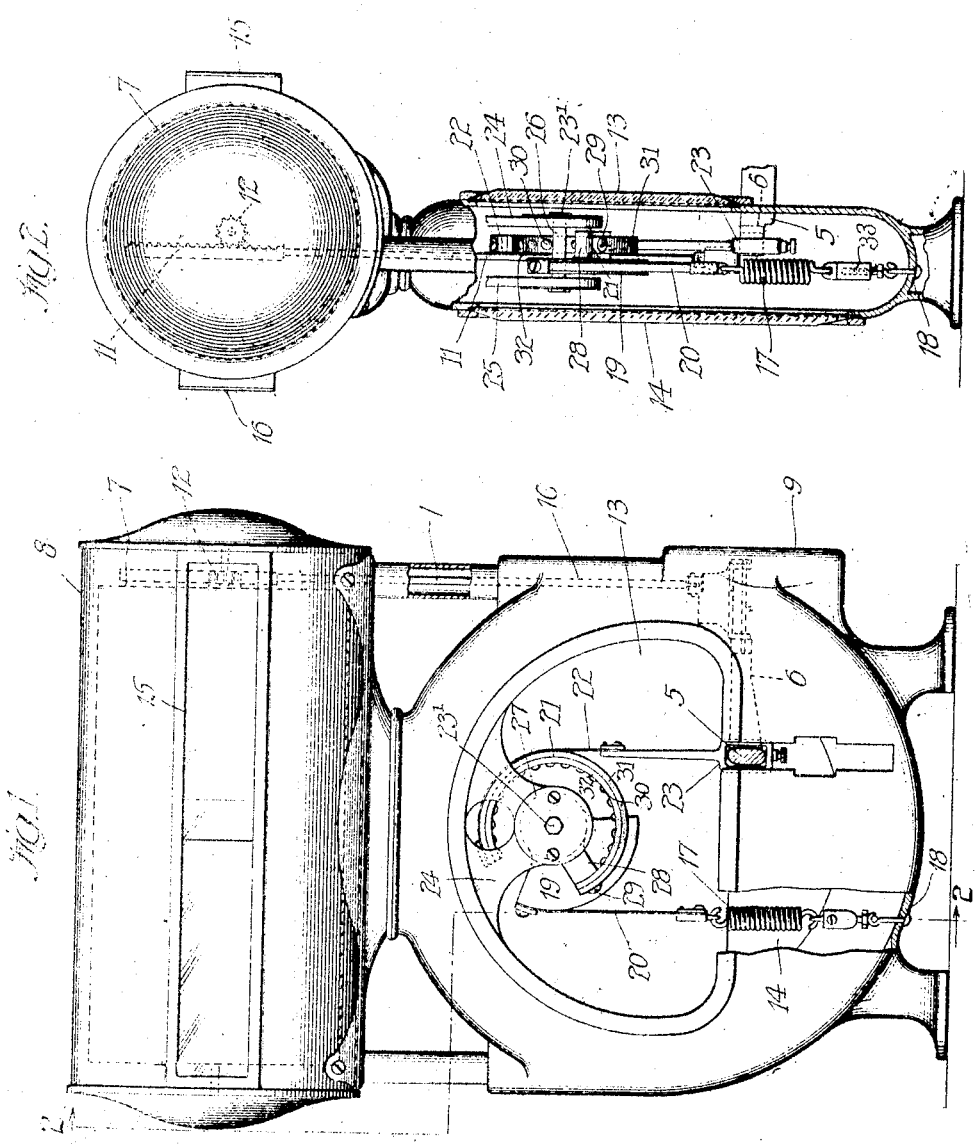

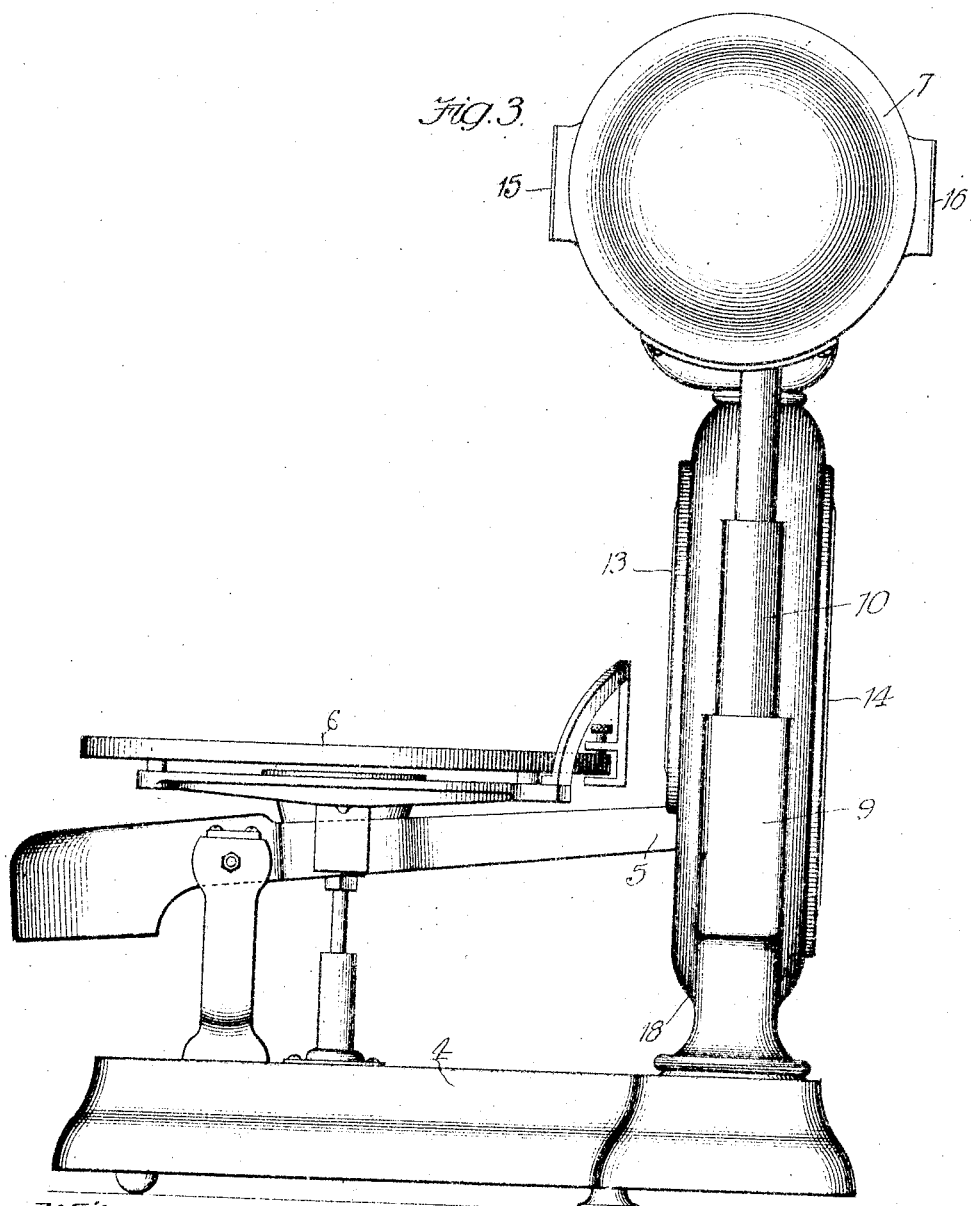

CLARENCE H. HAPGOOD, OF TOLEDO, OHIO, ASSIGNOR, BY MESNE ASSIGNMENTS, TO TOLEDO SCALE COMPANY, OF TOLEDO, OHIO, A CORPORATION OF NEW JERSEY.

SCALE.

1,256,689.

Specification of Letters Patent.

Patented Feb. 19, 1918.

Application filed March 23, 1912. Serial No. 686,978.

*To all whom it may concern:*

Be it known that I, CLARENCE H. HAPGOOD, a citizen of the United States, residing at Toledo, in the county of Lucas and State of Ohio, have invented certain new and useful Improvements in Scales, of which the following is a specification.

My invention relates more particularly to spring scales and has been described in connection therewith, though as will be understood from the following detailed description it is also applicable to scales employing other forms of counterbalance.

Scales in general are more or less affected by changes in temperature to which they are subjected, owing to the expansion and contraction of their parts, and while in scales other than those employing a spring for counterbalancing the weight of the commodity, the effect of changes of temperature are relatively unimportant, in spring scales the alteration in the length and tension of the spring by variations of temperature within the limits to which the scale is subjected are so great as to require correction in order to get results which are accurate within the degree required in ordinary commercial use. Various means have been resorted to for correcting such scales for variations in temperature of which those requiring manual adjustment are more common, though certain automatic adjustments depending upon the use of thermostats have also been employed.

My present invention relates to the latter class of adjustments for correction for changes in temperature and it involves the embodiment in the scale as a part of the connections between the commodity receptacle and the counterbalancing mechanism, of a thermostat adapted to correct not only for differences in the power or tension of the spring due to changes in temperature, but also for changes in the length of the spring due to the same cause.

In the accompanying drawings forming a part of this application, I have shown my invention in a preferred form applied to a well known type of scale and in the following description I have specifically described this structure, but it is to be understood as above stated that the invention is of general application and is not confined to this particular type of scale or to the particular structure shown, but is adapted for use in connection with a great variety of scales, and the structure may be changed or modified in many respects without departing from the scope thereof as set forth in the following claims.

Referring now to the drawings Figure 1 is a front elevation of the casing of the counterbalancing and indicating mechanism of our scale, the beam being shown in section and the casing broken away in parts to show the internal mechanism. Fig. 2 is an elevation in partial section at right angles to the plane of Fig. 1 on the offset line 2—2 of that figure. Fig. 3 is a view of the scale in side elevation.

In the particular form of scale chosen to exemplify my invention, the base 4, beam 5, commodity receiver or scale pan 6, and computing drum 7 are shown as of an ordinary type which will serve for explaining my invention. The computing drum 7, (see dotted lines Figs. 1 and 2) is mounted in a casing 8, which is supported upon a second casing 9 containing the counterbalancing mechanism. The beam 5 is offset at 6 and to the offset end thereof is pivoted a rack rod 10, the rack 11 of which meshes with a pinion 12 on the end of the drum shaft to rotate the drum. The counterbalancing mechanism is visible through front and back windows 13, 14 of its casing, and the chart may be observed through front and rear sight openings 15, 16, all of the parts described up to this point being common in scale construction.

The spring 17 is constructed and arranged to counterbalance the weight of the commodity in the scale pan and is connected at one end to the casing as at 18, and at the other end to a segment 19 by means of a ribbon 20, the segment being rigidly connected to a second segment 21 which in turn is connected by a band or ribbon 22, and a stirrup 23 to the end of the beam 5 (see Figs. 1 and 2) the segments 19 and 21 constituting an oscillatory connecting member which is pivoted in the casing 23. For this purpose the casing is provided with a pair of brackets 24, 25, on which is mounted a knife 26, which extends through the segment 19 and a casting 27 having an offset 28 to which the segment 21 is attached by a screw 29. The segment 19 may be formed in any desired manner as by casting, but the segment 21 which is connected to the scale beam is formed of a pair of strips of metal 30, 31, secured together as by rivets 32 throughout their length, the metal of the inner strip having a lesser coefficient of expansion than that of the outer strip and the two forming in effect a thermostat. In practice I have found that steel may be used as the metal of the inner strip and brass as that of the outer strip, though other metals or alloys may be employed having the necessary relation between their coefficients of expansion.

A shown more particularly in Fig. 2, a screw adjustment 33 is also provided between the spring and its attachment to the casing for the purpose of adjusting the indication to zero by hand when the scale is first set up.

The operation of the scale will be as usual in scales of this character. The imposition of a weight upon the scale pan lowers the end of the beam within the casing and the effect of the weight is transmitted from the beam through the ribbon 22, segment 21, segment 19 and ribbon 20 to the spring 17, which is extended until it counterbalances the weight of the commodity, when the weight indication and value computation may be read upon the chart as usual.

Whenever the temperature of the scale rises and the spring is thereby expanded and its tension diminished, the strips composing the segment 21 are also expanded, but in different degrees proportional to the coefficients of expansion of the metals of which they are composed, the outer strip, however, expanding at a greater rate than the inner strip. The segment is thereby caused to bend or curve inward, or in other words, its radius of curvature is reduced and it more nearly approaches the central pivot, the inward movement being greater as the point under consideration is more remote from the point of attachment of the segment. It follows from the consequent reduction of the radial distance of the point of application of the pull of the beam upon the segment, that the torsional effect upon the oscillatory member and consequently the tension upon the spring, due to any given weight upon the scale pan, is reduced. By properly choosing the metals employed and the dimensions of the strip which compose the thermostatic segment, the tension and length of the spring caused by variations in the surrounding temperature may be accurately neutralized. Many variations in the construction will of course suggest themselves to those skilled in the art, which variations are within the scope of my invention. Thus the segment connected to the spring may be the thermostatic member, though in this event the positions of the metals would necessarily be reversed in order that the curve might expand with increase in temperature. Again if a rack and gear segment were employed for either of the connections between the oscillating member and the beam and spring respectively, the segmental gear would be formed of the strips of metal having different coefficients of expansion, the construction being an obvious one, from what has been stated above. These and many other modifications which will suggest themselves are within the scope of my invention.

I claim:

1. In a weighing scale, a commodity receptacle and a load offsetting means, a lever member to the opposite arms of which said receptacle and means are respectively connected, said arms being respectively formed of materials having unequal expansion under increasing temperature whereby the relative radial distances of the points of connection of the receptacle and load offsetting means respectively are varied with variations in temperature.

2. In a weighing scale having a commodity receptacle and a load offsetting means, a lever member to the arms of which said receptacle and means are respectively connected, one of the arms of said lever consisting of a curved bar attached at one end to the pivotal portion of said lever, and a connection from said arms to the receiver and means respectively, whereby an increase in temperature affects the radius of curvature of the curved arm and varies the ratio between the arms of the lever.

3. A weighing scale having a commodity receiver and a load offsetting means, a lever to the arms of which said receiver and means are respectively connected, one of said arms being curved and composed of materials of unequal coefficients of expansion whereby a change in temperature changes the ratio of the arms of the lever.

4. A weighing scale having a commodity receptacle and a load offsetting means, a lever to the arms of which said receptacle and means are respectively connected, one of the arms of said lever consisting of a curved bar attached at one end to the pivotal portion of the lever and composed of strips of metal of unequal coefficients of expansion.

5. In a weighing scale having a commodity receiver and a load offsetting means, a pivoted lever member, one of the arms of which consists of a curved bar, the radius of curvature of which is substantially varied by changes in temperature whereby the effective length of said arm is varied, and means for connecting the commodity receptacle and the load offsetting means to the arms of the lever member.

6. A weighing scale having a commodity receiver and a load offsetting means, a lever to the arms of which said commodity receptacle and load offsetting means are respectively connected, one of said arms being curved and composed of a pair of strips of materials of unequal coefficients of expansion, the metal of greater coefficient of expansion being on the outside of the curve, the receptacle being attached to said curved arm and the load offsetting means to the other arm.

7. A weighing scale having a commodity receiver and a load offsetting means, a lever to the arms of which the commodity receiver and load offsetting means are respectively connected, one of said arms being arcuate and composed of material peculiarly susceptible to the influence of heat, a strap connected to said arcuate arm and connections from said strap and lever to the receiver and load offsetting means respectively.

8. A scale having a commodity receiver and a load offsetting means, a pivoted lever to the arms of which said receiver and means are respectively connected, one of the arms consisting of a bar formed of two strips of metal of unequal coefficients of expansion, said bar being attached at one end to the pivotal portion of the lever and curved about the pivot thereof and a strap secured to the free end of said bar and passing over the curved periphery thereof and connected to the receptacle and a connection from the lever to the load offsetting means.

9. A weighing scale having a receiver and a load offsetting means, a lever intermediate the same consisting of a pair of segments, one of which segments is formed of a curved bar comprising strips of metal of unequal coefficients of expansion and straps secured to said segments and coöperating with the curved faces thereof and also secured to the load offsetting means and receiver respectively.

10. A weighing scale having a receiver and a load offsetting means, a lever intermediate the same comprising a pair of segments, a strap connection from one of said segments to the load offsetting means, the other segment consisting of a curved bar composed of two metal strips of unequal coefficients of expansion, that of the greater coefficient of expansion being on the outside of the curve and a strap fastened to the free end of said bar passing over the periphery thereof and secured to the receiver.

11. In a weighing scale, a commodity receptacle and a spring, a lever member to the opposite arms of which said receptacle and spring are respectively connected, said arms being respectively formed of material having unequal expansion under increasing temperature whereby the relative radial distances of the points of connection of the receptacle and spring respectively are varied with variations in temperature.

12. In a weighing scale having a commodity receptacle and a spring, a lever member to the arms of which said receptacle and spring are respectively connected, one of the arms of said lever consisting of a curved bar attached at one end to the pivotal portion of said lever, and a connection from said arms to the receiver and spring respectively, whereby an increase in temperature effects the radius of curvature of the curved arm and varies the ratio between the arms of the lever.

13. A weighing scale having a commodity receiver and a spring, a lever to the arms of which said receiver and spring are respectively connected, one of said arms being curved and composed of materials of unequal coefficients of expansion whereby a change in temperature changes the ratio of the arms of the lever.

14. A weighing scale having a commodity receptacle and a spring, a lever to the arms of which said receptacle and spring are respectively connected, one of the arms of said lever consisting of a curved bar attached at one end to the pivotal portion of the lever and composed of strips of metal of unequal coefficients of expansion.

15. In a weighing scale having a commodity receiver and a spring, a pivoted lever member, one of the arms of which consists of a curved bar, the radius of curvature of which is substantially varied by changes in temperature whereby the effective length of said arm is varied and means for connecting the commodity receptacle and the spring to the arms of the lever member.

16. A weighing scale having a commodity receiver and a spring, a lever to the arms of which said commodity receptacle and spring are respectively connected, one of said arms being curved and composed of a pair of strips of materials of unequal coefficients of expansion, the metal of greater coefficient of expansion being on the outside of the curve, the receptacle being attached to said curved arm and the spring to the other arm.

17. A weighing scale having a commodity receiver and a spring, a lever to the arms of which the commodity receiver and spring are respectively connected, one of said arms being arcuate and composed of material peculiarly susceptible to the influence of heat, a strap connected to said arcuate arm and connections from said strap and lever to the receiver and spring respectively.

18. A scale having a commodity receiver and a spring, a pivoted lever to the arms of which said receiver and spring are respectively connected, one of the arms consisting of a bar formed of two strips of metal of unequal coefficients of expansion, said bar being attached at one end to the pivotal portion of the lever and curved about the pivot thereof and a strap secured to the free end of said bar and passing over the curved periphery thereof and connected to the receptacle and a connection from the lever to the spring.

19. A weighing scale having a receiver and a spring, a lever intermediate the same consisting of a pair of segments, one of which segments is formed of a curved bar comprising strips of metal of unequal coefficients of expansion and straps secured to said segments and coöperating with the curved faces thereof and also secured to the spring and receiver respectively.

20. A weighing scale having a receiver and a spring, a lever intermediate the same comprising a pair of segments, a strap connection from one of said segments to the spring, the other segment consisting of a curved bar composed of two metal strips of unequal coefficients of expansion, that of the greater coefficient of expansion being on the outside of the curve and a strap fastened to the free end of said bar passing over the periphery and secured to the receiver.

21. A scale comprising a goods receiver, a spring counterbalance 17, an oscillatory member comprising two segments 19, 21 connected to the spring and goods receiver respectively, the segment 21 being formed of a pair of strips of metals having different coefficients of expansion.

CLARENCE H. HAPGOOD.

Witnesses:
J. D. BUCKHOLDER,
E. E. LONGENECKER.